(12) United States Patent
Stephens

(10) Patent No.: US 7,072,652 B2
(45) Date of Patent: Jul. 4, 2006

(54) HANDOFF APPARATUS, SYSTEMS, AND METHODS

(75) Inventor: Adrian P. Stephens, Cottenham (GB)

(73) Assignee: Intel Corporation, Santa Clara, CA (US)

( * ) Notice: Subject to any disclaimer, the term of this patent is extended or adjusted under 35 U.S.C. 154(b) by 33 days.

(21) Appl. No.: 10/736,159

(22) Filed: Dec. 15, 2003

(65) Prior Publication Data

US 2005/0130658 A1    Jun. 16, 2005

(51) Int. Cl.
*H04Q 7/20* (2006.01)
(52) U.S. Cl. .............................. 455/432.1; 455/435.1; 455/436; 455/425; 455/424
(58) Field of Classification Search ................ 455/436; 370/437, 438, 439, 442, 443, 331, 395.21
See application file for complete search history.

(56) References Cited

U.S. PATENT DOCUMENTS

| 6,360,264 | B1 * | 3/2002 | Rom ........................... 709/227 |
| 6,377,804 | B1 | 4/2002 | Lintulampi |
| 6,842,621 | B1 * | 1/2005 | Labun et al. ............. 455/456.3 |
| 2002/0045447 | A1 | 4/2002 | Rasanen |
| 2003/0093526 | A1 | 5/2003 | Nandagopalan et al. |
| 2003/0203735 | A1 * | 10/2003 | Andrus et al. ............... 455/436 |
| 2004/0009770 | A1 * | 1/2004 | Sivanandan et al. ........ 455/425 |
| 2004/0114546 | A1 * | 6/2004 | Seshadri et al. .......... 370/310.2 |
| 2004/0203747 | A1 * | 10/2004 | Uchida .................... 455/432.1 |
| 2004/0214572 | A1 * | 10/2004 | Thompson et al. ....... 455/435.2 |
| 2005/0059396 | A1 * | 3/2005 | Chuah et al. ............. 455/435.1 |
| 2005/0111427 | A1 * | 5/2005 | Li et al. ...................... 370/343 |
| 2005/0135239 | A1 * | 6/2005 | Cromer et al. .............. 370/229 |
| 2005/0147062 | A1 * | 7/2005 | Khouaja et al. ............ 370/332 |
| 2005/0255847 | A1 * | 11/2005 | Han et al. .................... 455/436 |

FOREIGN PATENT DOCUMENTS

| EP | 0589552 A2 | 3/1994 |
| EP | 1349409 A1 | 10/2003 |

OTHER PUBLICATIONS

"International Search Report for corresponding PCT Application No. PCT/US2004/038984", (Mar. 16, 2005),4 pgs.
Lefkowitz, M., et al., "IEEE P802.11 Wireless LANs—Proposed Draft Text for the Site Reporting Mechanism for TGk", *IEEE Submission, doc.: IEEE 802.11-03/174r0A*, (Mar., 2003), 4 pgs.
Lefkowitz, M., et al., "Site Reporting", *IEEE Submission, doc.: IEEE 802.11-03/174r0, Trapeze Networks*, (Mar. 7, 2003), 9 pgs.

* cited by examiner

*Primary Examiner*—Joseph Feild
*Assistant Examiner*—Kamran Afshar
(74) *Attorney, Agent, or Firm*—Schwegman, Lundberg, Woessner & Kluth, P.A.

(57) ABSTRACT

An apparatus and a system, as well as a method and article, may operate to receive a request associated with a specification at a first access point, and to locate a second access point capable of supporting the specification. A handoff from the first access point to the second access point may be effected.

12 Claims, 6 Drawing Sheets

HANDOFF APPARATUS, SYSTEMS, AND METHODS

TECHNICAL FIELD

Various embodiments described herein relate to communications generally, including apparatus, systems, and methods used to communicate information via wireless devices.

BACKGROUND INFORMATION

In various geographic locations, multiple access points (APs) are available to communicate with wireless devices. Ideally, communications can be conducted in a seamless fashion, with a consistent quality of service, even when communication is initiated at one AP and completed at another AP.

In some instances, it may be the responsibility of the device (e.g., as part of a client device to first access point (AP) to potential second AP link) to generate traffic streams having a quality of service defined by a traffic specification (TSPEC). However, when a handoff may be needed, such as when the device roams away from communicating with one AP into a different area, it may not be able to determine which of several candidate APs in the new area can support the current specification. Making such a determination incorrectly may interrupt service of the traffic stream long enough to create a perceptible loss of quality in an application running on the device. While it may be possible to use heuristics to predict whether a selected AP can support a particular specification (e.g. based on past usage history, or on an observation of activity in the device's basic service set), the resulting accuracy may be limited.

DETAILED DESCRIPTION

Figure 1:
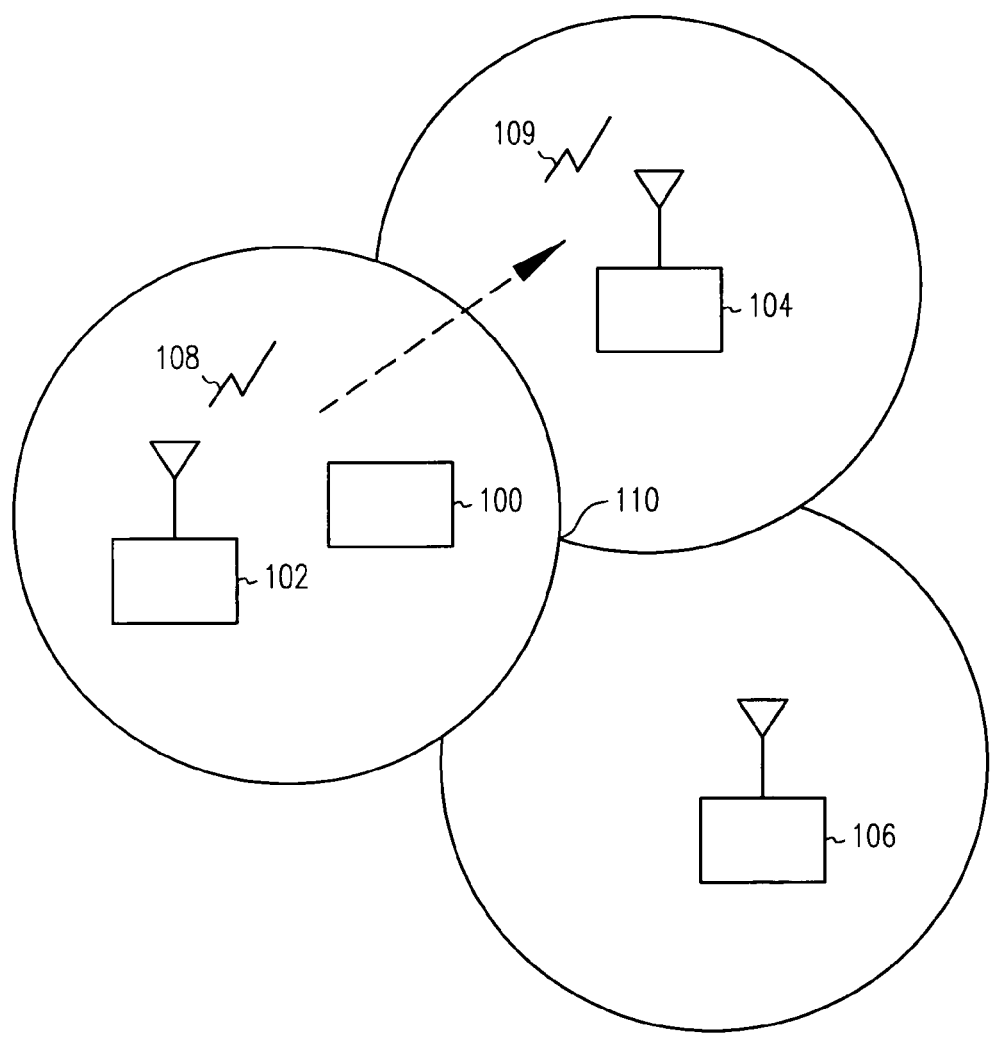
FIG. 1 is a block diagram of an apparatus moving among access points according to various embodiments.

To assist in providing a quality connection to various APs as the need arises, such as when a device roams among them and a handoff becomes desirable, some embodiments may provide negotiation of the quality of service (e.g., verifying support of a specification) with potential roaming destinations. For example, assume that a device (e.g., a client device, a wireless computing platform, such as a personal digital assistant (PDA), a cellular telephone, etc.) has the ability to roam among multiple APs. Initially, the device may negotiate a quality of service by verifying that a first AP can support a desired specification (e.g., a TSPEC).

As the device roams, it may scan the surrounding area to discover and construct a list of candidate APs within wireless range. Candidate APs willing to support the desired/existing specification may be discovered in several ways, including direct communication by the device with the candidates, or having the first AP communicate with the candidates on behalf of the device.

For example, in some embodiments, the device may know one or more of the candidate AP's MAC (media access control) or IP (internet protocol) addresses via scanning, and a request associated with the specification may be sent to candidate APs using the first AP merely as a point of access to the infrastructure network. Thus, in this case, the first AP does not have to understand the content of the communication between the device and the candidates, and does nothing to negotiate support of the specification on behalf of the device.

Alternatively, in some embodiments, a request associated with the specification (e.g., a TSPEC request) may be sent to one or more of the candidate APs by the first AP, and responses may be received at the first AP. This approach may be used to obviate the need for the device to repeatedly describe the specification to candidates, as the first AP should already have this information. Thus, it is possible that any part, or all of the list of candidates may be passed to the first AP (having knowledge of the specification), and the first AP may then contact one or more candidate APs to discover which of them are able to support the specification. The first AP may then return a list of one or more APs capable of supporting the specification to the device. In this case, then, the first AP may act as a proxy for the device, and no direct communication may be necessary between the device and a second AP (e.g., one of the candidate APs capable of supporting the specification) until the device communications are actually handed off to the second AP. In each case, after it has been determined that a second AP can support the specification, communications with the device may be handed off to the second AP with some confidence that the new connection will provide a desired quality of service.

Signaling among the device and the APs, as well as among the APs themselves may be conducted in accordance with an Institute of Electrical and Electronics Engineers (IEEE) 802.11 protocol. For more information on the various IEEE 802.11 standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related versions.

FIG. 1 is a block diagram of an apparatus 100 roaming among access points 102, 104, 106 according to various embodiments. For example, the apparatus 100 (e.g., a wireless device, including a wireless computation platform, a cellular telephone, a wireless client, etc.) may switch from communicating with a first AP 102 (e.g., a node, base station, etc.) to communicating with a second AP 104 (e.g., another node, base station, etc.). A third AP 106 may also offer a connection to the apparatus 100 as the apparatus 100 moves from communicating with the first AP 102, using connection 108, to communicating with the second AP 104, using connection 109. A handoff from the first AP 102 to the second AP 104 may be made, based on the quality of service available to the apparatus 100 from the second AP 104. The quality of service determination may depend on whether a specification (e.g., a TSPEC) in use by the apparatus 100 and the first AP 102 can be supported by the second AP 104. Connections 107, 108 may comprise one or more transmit paths, and/or one or more receive paths, including a portion of a multiple-input, multiple-output (MIMO) system.

Figure 2:
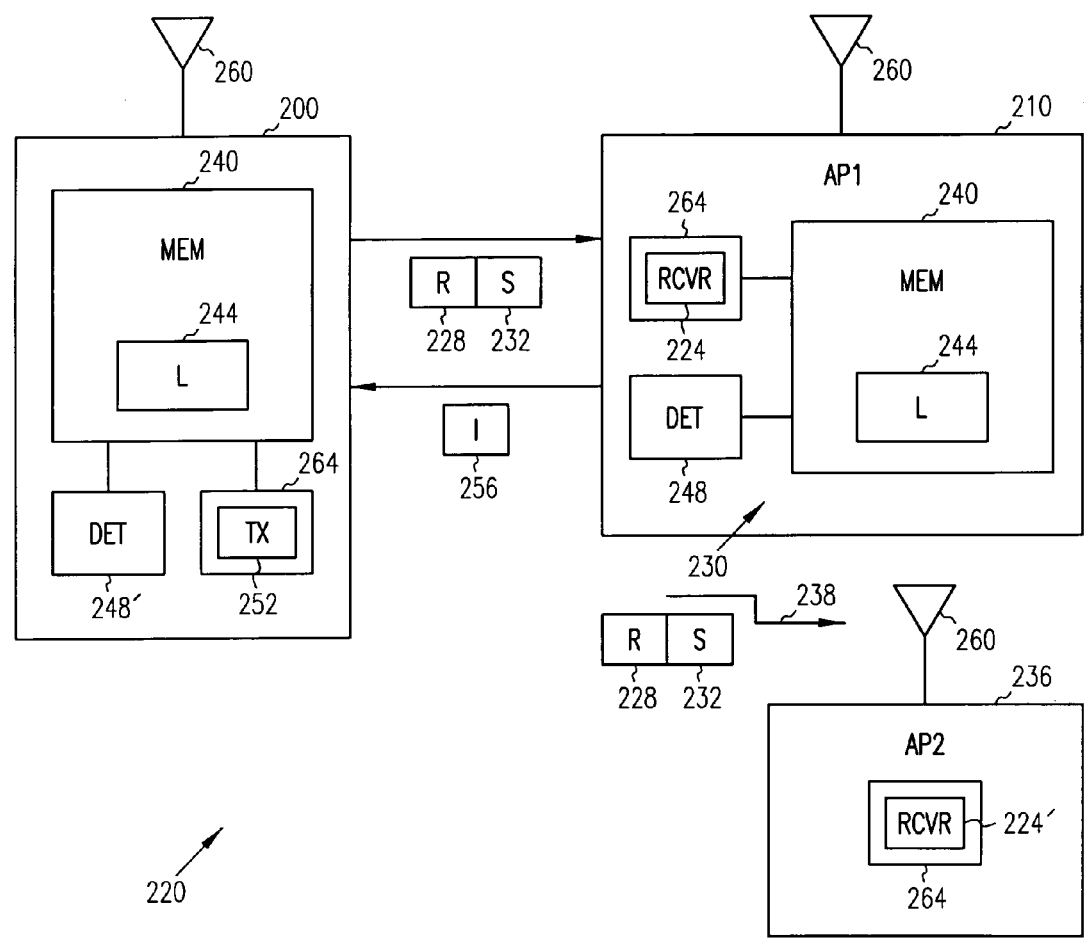
FIG. 2 is a block diagram of various apparatus and systems according to several embodiments.

While the apparatus 100 is operating within range of the APs 102, 104, 106, near the intersecting area 110, loss of communications may occur suddenly and without warning, such that the appearance of a seamless connection will be lost unless a candidate AP 104 having a better connection 109 (e.g., better than the connection 108 available from the AP 102) can be found. Several embodiments provide a mechanism to accomplish this. Using the supported specification determination approach described herein, candidate APs capable of supporting a desired specification can be determined with some reliability, so as to provide a high quality, seamless connection for the apparatus 100 after a handoff of communications from the AP 102 to the AP 104, for example FIG. 2 is a block diagram of various apparatus 200, 210 and systems 220 according to several embodiments. Thus, in some embodiments, an apparatus 210 may comprise a receiver 224 to receive a request 228 associated with a specification 232. The apparatus 210 may comprise an AP 230, and the request 228 may be used to locate a second AP 236 capable of supporting the specification 232. A connection 238, either wired or wireless, may exist or be formed between the AP 230 and the second AP 236.

The apparatus 210 may include a memory 240 coupled to the receiver 224 to store a list 244 of candidate APs including the second AP 236. The apparatus 210 may also include a determination module 248 to determine the capability of a candidate AP (e.g., AP 236) to support the specification 232. The specification 232 may comprise a traffic specification (e.g., a TSPEC) selected in accordance with one or more IEEE 802.11 standards, including IEEE 802.11e and similar amendments.

In some embodiments, an apparatus 200 may comprise a transmitter 252 to send a request 228 associated with a specification 232 to a first AP 230 to locate a second AP 236 capable of supporting the specification 232. The apparatus 200 may also include a memory 240 coupled to the transmitter 252 to store a list 244 of candidate APs (including the second AP 236).

The apparatus 200 may also comprise a determination module 248', which may be similar to or identical to the determination module 248, to determine the capability of a candidate AP 236 to support the specification 232, which may include a TSPEC. As noted previously, a determination as to whether the candidate AP 236 can support the specification 232 may be made in a number of ways, including sending the request 228 and specification 232 to the candidate AP 236. An indication 256 may be received by the apparatus 200 to directly indicate that the second AP 236 can support the specification, or alternatively, the indication 256 may include information sufficient for the apparatus 200 to determine that the specification 232 may be supported by the second AP 236.

In another embodiment, a system 220 may comprise either one or both of the apparatus 200, 210 described previously, as well as an antenna 260, which may comprise a monopole, a dipole, an omnidirectional antenna, or a patch antenna, among others. The apparatus 200 and the second AP 236 may also comprise an antenna 260. As noted above, in some embodiments, the apparatus 210 (e.g., comprising an AP) may be used to negotiate support of the specification 232 with an apparatus 200 (e.g., a device, station, and/or client unit) that generates the request 228, and from which the request 228 is received.

The system 220 may also include a second receiver 224' included in the second AP 236 to receive the request 228 associated with the specification 232. In some embodiments, the second AP #236 may be used to determine whether the specification 232 can be supported by the second AP236, and the second AP may include an antenna 260. Any of the receivers 224, 224' may be included in a transceiver 264.

Similarly, the transmitter 252 may also be included in a transceiver 264. To more completely describe the operation of some the apparatus and systems described herein, various possible activity sequences will be presented next.

Figure 3:
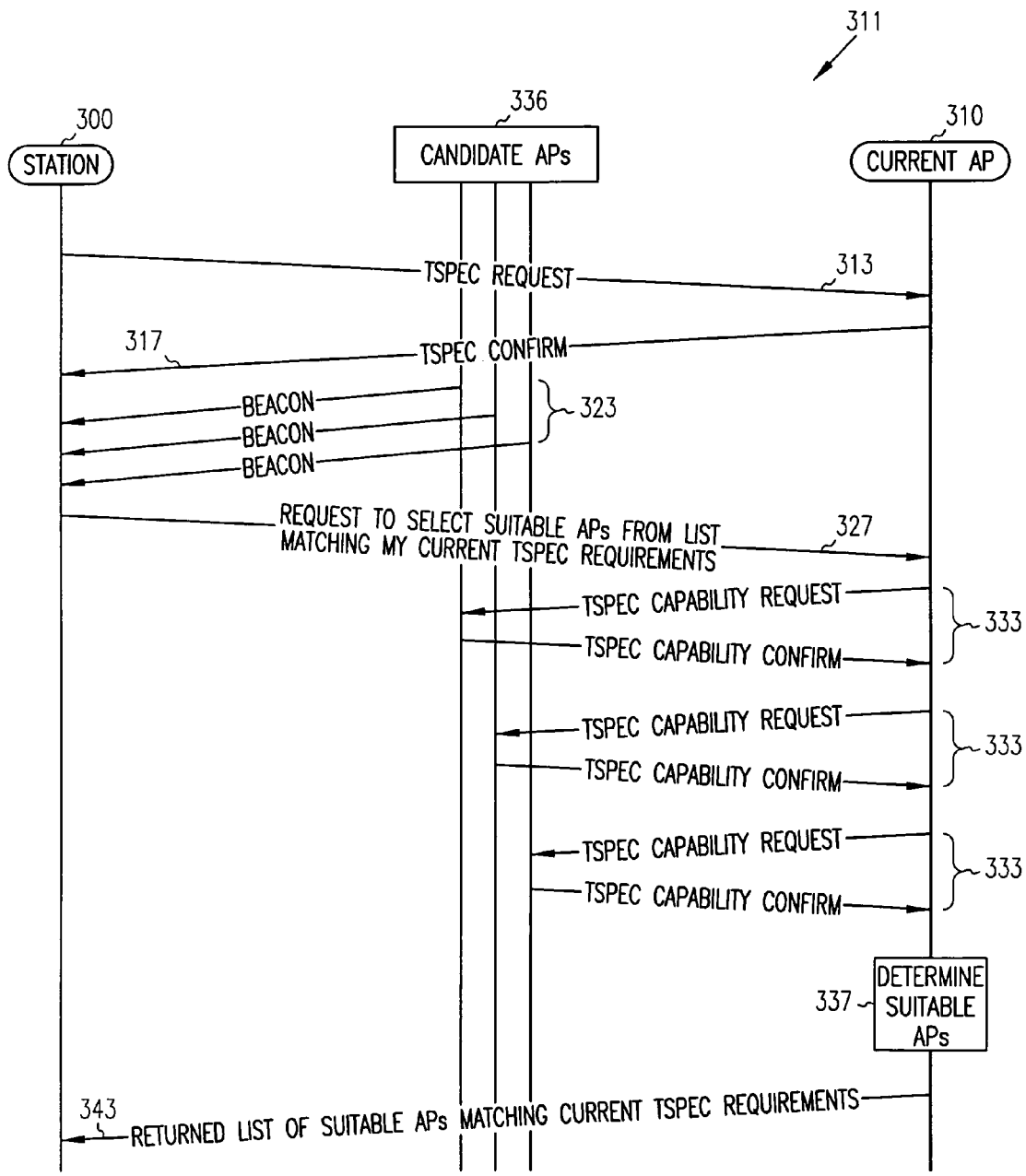
FIG. 3 is a signaling diagram of handoff determination by an AP according to several embodiments.

For example, FIG. 3 is a signaling diagram 311 of handoff determination by an AP according to several embodiments. Here a first apparatus 300, such as a mobile computing platform, station, or other device is shown communicating with a second apparatus 310, such as an AP. The apparatus 300, 310 may be similar to or identical to the apparatus 200, 210, respectively (see FIG. 2). In this scenario, a possible activity sequence involving the determination of a suitable candidate device 336 for handoff by the device currently communicating with the apparatus 300 (i.e., the apparatus 310) is illustrated. To simplify the following discussion, the terms "station", "AP", and "candidate" will be used with respect to elements 300, 310, and 336, respectively.

The station 300 may communicate a specification, perhaps in the form of a request 313, to the AP 310. In return, the AP 310 may confirm its own ability to support the specification in the form of a confirmation response 317. As the station 300 moves about, communications 323 indicating the presence of handoff candidates 336, such as beacon frames, may be received by the station 300. Each such communication 323 may be used by the station 300 to compile a list of candidates 336. The list, perhaps included in a request 327, may be communicated to the AP 310 by the station 300. The request 327 may include a request to select suitable candidates (e.g., other APs) from the list that can support the specification, such as confirming the ability to match current TSPEC requirements.

A series of requests and confirmation communications 333 may then occur between the AP 310 and the potential candidates 336. These communications 333 may include requests to support the desired specification, as well as confirmations (or denial) of support, including TSPEC capability confirmations (or denials). At this point, the AP 310 may determine which of those candidates originally listed by the station 300 has the capability to support the desired specification at block 337. A communication response 343, perhaps including a list of suitable candidates 336 may then be returned to the station 300 so that a handoff to one of the candidates may occur.

Figure 4:
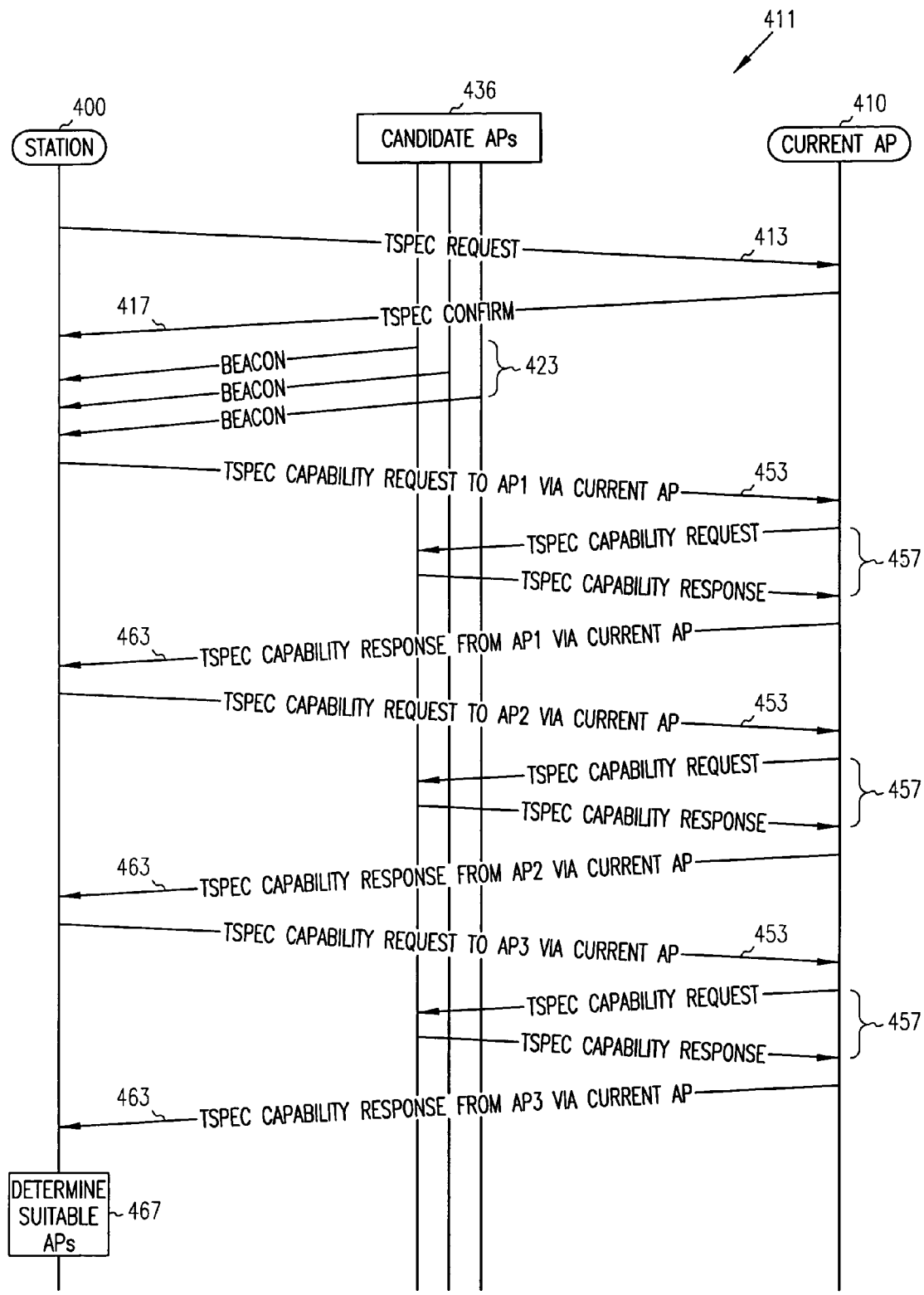
FIG. 4 is a signaling diagram of handoff determination by a device according to several embodiments.

As another example, FIG. 4 is a signaling diagram of handoff determination by a device according to several embodiments. Again, a first apparatus 400, such as a mobile computing platform, station, or other device is shown communicating with a second apparatus 410, such as an AP. The apparatus 400, 410 may be similar to or identical to the apparatus 200, 210, respectively (see FIG. 2). In this scenario, a possible activity sequence involving the determination of a suitable candidate device 436 for handoff by the apparatus 300 itself is illustrated. To simplify the following discussion, the terms "station", "AP", and "candidate" will be used with respect to elements 400, 410, and 436, respectively.

The station 400 may communicate a specification, perhaps in the form of a request 413, to the AP 410. In return, the AP 410 may confirm its own ability to support the specification in the form of a confirmation reponse 417. As the station 400 moves about, communications 423 indicating the presence of handoff candidates 436, such as beacon frames, may be received by the station 400. Each such communication 423 may be used by the station 400 to compile a list of candidates 436. A number of requests 453, may be communicated to the AP 310 by the station 300. The requests may in turn be communicated to one or more of the candidate APs 436 in turn, and one or more of the requests may include a request to select suitable candidates (e.g., other APs) from the list that can support the specification, such as confirming the ability to match current TSPEC requirements.

Thus, some portion or all of one or more of the requests 453 may be included as part of a series of requests and confirmation communications 457 that may occur between the AP 410 and the potential candidates 436. These communications 457 may include requests to support the desired specification on behalf of the station 400, as well as confirmations (or denial) of support, including TSPEC capability confirmations (or denials). Responses 463, in sequence (as shown in FIG. 4), or in parallel, may then be communicated to the station 300 by the AP 310. At this point, the station 400 may determine which of those candidates 436 originally listed by the station 400 has the capability to support the desired specification at block 467, and communications may then be handed off from the AP 410 to any suitable candidate 436, as determined by the station 400.

The apparatus 100, 200, 210, 300, 310, 400, 410, APs 102, 104, 106, 236, 336, 436, connections 108, 109, 238, intersecting area 110, receivers 224, 224', request 228, specification 232, memories 240, lists 244, determination modules 248, 248', transmitter 252, indication 256, antennas 260, and transceivers 264 may all be characterized as "modules" herein. Such modules may include hardware circuitry, and/or one or more processors and/or memory circuits, software program modules, including objects and collections of objects, and/or firmware, and combinations thereof, as desired by the architect of the apparatus 100, 200, 210, 300, 310, 400, 410, and systems 220, and as appropriate for particular implementations of various embodiments.

It should also be understood that the apparatus and systems of various embodiments can be used in applications other than for wireless computing platforms, and other than for migration among APs, and thus, various embodiments are not to be so limited. The illustrations of apparatus 100, 200, 210, 300, 310, 400, 410, and systems 220 are intended to provide a general understanding of the structure of various embodiments, and they are not intended to serve as a complete description of all the elements and features of apparatus and systems that might make use of the structures described herein.

Applications that may include the novel apparatus and systems of various embodiments include, but are not limited to, electronic circuitry used in high-speed computers, communication and signal processing circuitry, modems, processor modules, embedded processors, and application-specific modules, including multilayer, multi-chip modules. Such apparatus and systems may further be included as sub-components within a variety of electronic systems, such as televisions, cellular telephones, personal computers, PDAs, workstations, radios, video players, vehicles, and others.

Figure 5:
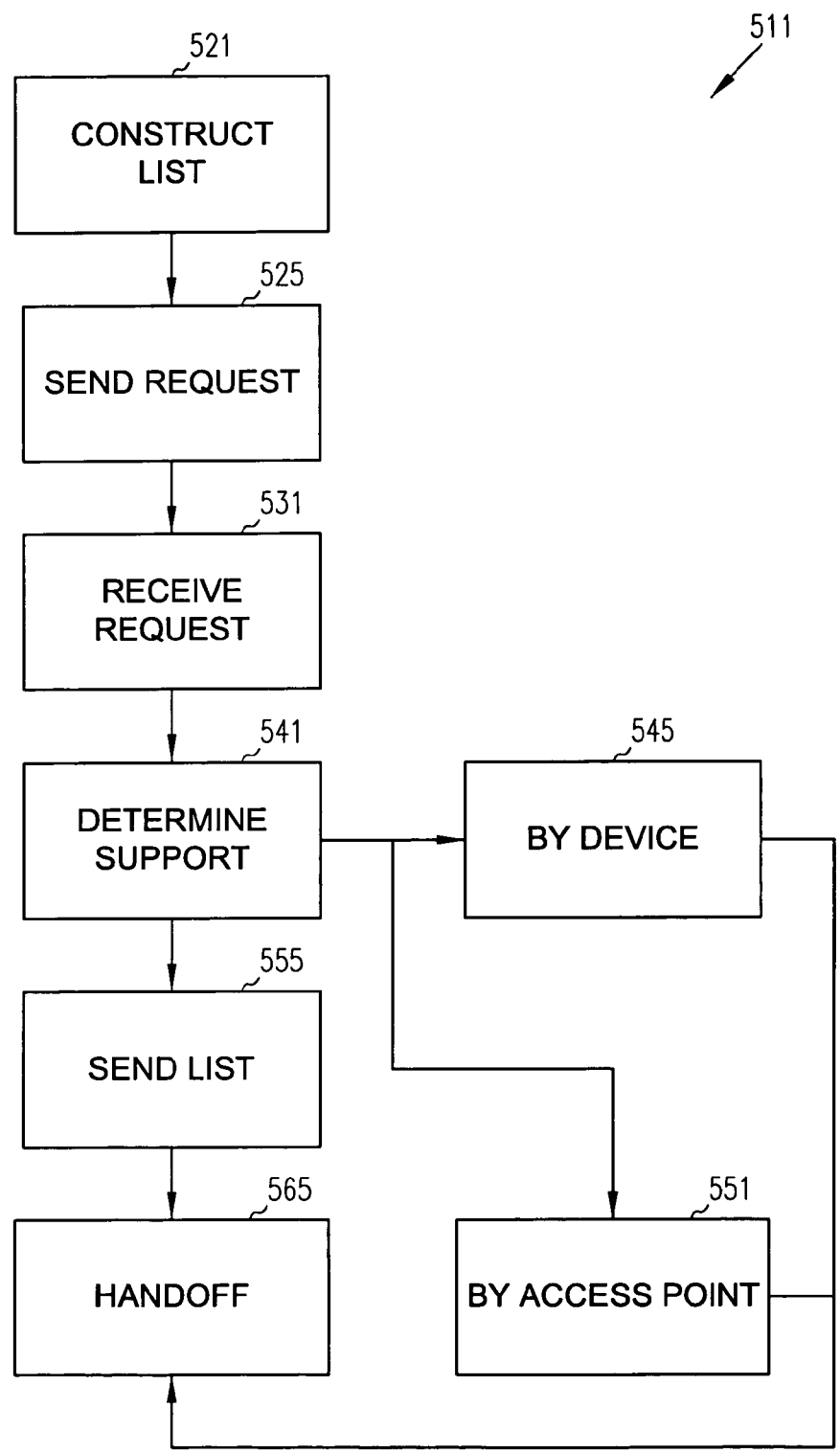
FIG. 5 is a flow chart illustrating several methods according to various embodiments.

FIG. 5 is a flow chart illustrating several methods according to various embodiments. A method 511 may (optionally) begin with constructing a list of one or more candidate APs (including a second AP that is capable of supporting a specification governing communications between a device and a first AP) at block 521. As noted above, the list may be formulated in a number of ways, including scanning the area for APs within range of the device.

The method 511 may further include sending a request associated with the specification to at least one of the candidate APs at block 525. In some embodiments, the request may be sent to the AP currently communicating with the station (i.e., the first AP). The AP, in turn, may then communicate the specification to one or more of the listed candidates. In some embodiments, the list may be sent by way of the AP, and communicated to various candidates via the AP, such that the AP serves merely as a communication waypoint between the station and the candidates. Thus, the method 511 may continue with receiving the request associated with the specification at a first AP to locate a second AP capable of supporting the specification at block 531. Receiving the request at block 531 may include receiving a list of candidate APs including the second AP at the first AP.

The specification may include any number of conditions or requirements, including at least one of a network type, a network capability, a network activity level, a measure of available service, an AP capability, a signal strength (e.g., transmit power), a bandwidth, a signal-to-noise ratio, a signal-to-interference ratio, a multipath condition, a service provider, a monetary cost, user-preferred information, a user-preferred service, a nominal packet size, a maximum packet size, a minimum service interval, a maximum service interval, a minimum data rate, a mean data rate, a maximum burst size, a minimum physical-layer rate, a peak data rate, a delay bound, a surplus bandwidth allowance, an acknowledgement policy, and a user priority. One example of an AP capability includes a traffic specification (TSPEC), such as a TSPEC selected in accordance with an IEEE 802.11 standard.

The method 511 may include determining that the second access AP will support the specification at block 541. This may occur in several ways, as described previously. For example, the method 511 may include determining a second AP capable of supporting the specification by a self-determination request (e.g., the information received in response to this request, from either the first or second AP, allows the device to determine that the specification is supported by the second AP) sent from the device to the first AP at block 545. The method 511 may also include determining a second AP capable of supporting a specification by an AP determination request (e.g., the information received in response to this request permits the first AP to determine that the second AP can support the specification) sent to the first AP at block 551.

Thus, the determination of specification support may be made by the device (self-determination) at block 545, or by an access point (AP determination) at block 551. In this second case, the determination may be made by either the first AP (based on appropriate queries directed from the first AP to the second AP), or by the second AP, which may return an indication of support (or partial support, or non-support) to the first AP and/or the device. The AP determination request may include a list of candidate APs including the second access point.

The method 511 may include sending a list of one or more APs capable of supporting the specification, including the second AP, to the device from which the request was received at block 555. The method may also include handing off a communication between the first AP and the device to the second AP upon receiving an indication that the second AP is capable of supporting the specification at block 565.

Many embodiments and variations thereof may be realized. For example, the first AP may provide intelligence (e.g., making an independent determination as to whether one of the candidate APs can support the specification), or merely act as a resource to communicate requests from the device to candidate APs. In addition, the device may scan to establish or construct a list of APs within its receiver range (i.e., those access points having transmissions accessible to the client), or operate to obtain lists from other devices or APs. Partial lists may be distributed among various APs, if desired.

The device may operate to score and/or rank potential handoff candidate APs on the list according to some attribute, including signal strength or quality. To determine whether a second AP can support the specification, the device may receive an indication (e.g., validation) from the second AP (directly, or via the first AP) or the device may receive the indication from either of the APs (such that the first AP or the second AP performs the determination (e.g., validation). After a determination is made, the device may then roam to the second access point, where a handoff of communications between the first AP and the client to the second AP may be made.

Other variations of the determination scenario may be realized. For example, the device may receive a counter-proposal with respect to supporting the specification, such that the specification may not be supported per se, but an alternative specification may be supported (and be acceptable) to the device. In addition, the determination of support may be scored, such that individual candidate APs may be scored as fully willing to support the specification, partially willing to support the specification (e.g., returning one or more counter-proposals), unwilling (e.g., one or more refusals to support the specification), and deaf (e.g., no response).

It should be noted that the methods described herein do not have to be executed in the order described, or in any particular order. Moreover, various activities described with respect to the methods identified herein can be executed in serial or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well-known to those skilled in the art, such as application program interfaces or interprocess communication techniques, including remote procedure calls. The teachings of various embodiments are not limited to any particular programming language or environment, including Hypertext Markup Language (HTML) and Extensible Markup Language (XML). Thus, other embodiments may be realized, as shown in FIG. 6.

Figure 6:
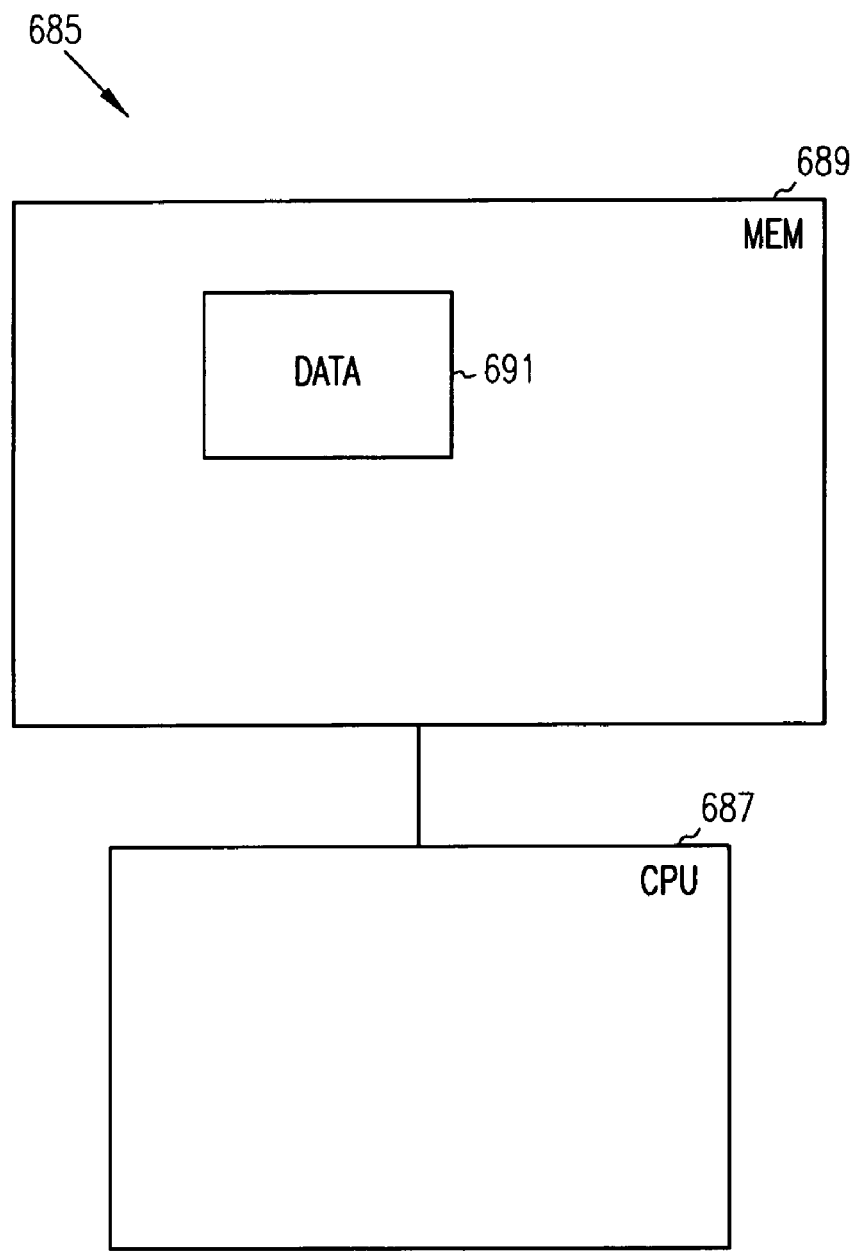
FIG. 6 is a block diagram of an article according to various embodiments.

FIG. 6 is a block diagram of an article 685 according to various embodiments, such as a computer, a wireless computing platform, a memory system, a magnetic or optical disk, some other storage device, and/or any type of electronic device or system. The article 685 may comprise a processor 687 coupled to a machine-accessible medium such as a memory 689 (e.g., a memory including an electrical, optical, or electromagnetic conductor) having associated data 691 (e.g., computer program instructions), which, when accessed, results in a machine (e.g., the processor 687) performing such actions as receiving a request associated with a specification at a first AP to locate a second AP capable of supporting the specification. Other actions may include constructing a list of candidate APs including the second access point, as well as sending the request associated with the specification to at least one of the candidate access points including the second AP, determining, by the second AP, that the second AP will support the specification, and then sending a list of APs capable of supporting the specification, including the second AP, to the device from which the request was received. As noted previously, the specification may include a TSPEC selected in accordance with an IEEE 802.11 standard.

Improved AP and network connection quality may result from implementing the apparatus, systems, and methods disclosed herein. Traffic stream service interruptions may be reduced, and the reliability of specification support provided during connection handoffs, such as may occur during roaming activity, may be improved.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate embodiment.

What is claimed is:

1. A wireless communication method, comprising:
  receiving a request associated with a specification defining a traffic stream quality of service at a first access point to locate a second access point to support the specification; and
  receiving a list of candidate access points including the second access point at the first access point;
  determining, by the first access point, that the second access point will support the specification,
wherein the specification includes a traffic specification selected in accordance with an Institute of Electrical and Electronics Engineers (IEEE) 802.11 standard; and communicating the request to the second access point.

2. The method of claim 1, wherein the specification includes at least one of a network type, a network capability, a network activity level, an access point capability, a signal strength, a bandwidth, a signal-to-noise ratio, a signal-to-interference ratio, a multipath condition, a service provider, a monetary cost, user-preferred information, a user-preferred service, a nominal packet size, a maximum packet size, a minimum service interval, a maximum service interval, a minimum data rate, a mean data rate, a maximum burst size, a minimum physical-layer rate, a peak data rate, a delay bound, a surplus bandwidth allowance, an acknowledgement policy, and a user priority.

3. The method of claim 1, further comprising:
constructing the list of candidate access points including the second access point.

4. An article for use in wireless communication comprising a machine-accessible medium having associated data, wherein the data, when accessed, results in a machine performing:
receiving a request associated with a specification defining a traffic stream quality of service at a first access point to locate a second access point to support the specification;
constructing a list of candidate access points including the second access point;
determining, by the second access point, that the second access point will support the specification, wherein the specification includes a traffic specification selected in accordance with an Institute of Electrical and Electronics Engineers (IEEE) 802.11 standard; and
communicating the request to the second access point.

5. The article of claim 4, wherein the data, when accessed, results in the machine performing:
sending a list of access points to support the specification, including the second access point, to a device from which the request was received.

6. A wireless communication apparatus within a first access point, comprising:
a transceiver to receive a request, the request being associated with a specification defining a traffic stream quality of service, at the first access point to locate a second access point to support the specification, and to communicate the request to the second access point;
a memory coupled to the transceiver to store a list of candidate access points including the second access point; and
a determination module to determine a capability of a candidate access point to support the specification, wherein the specification includes a traffic specification selected in accordance with an Institute of Electrical and Electronics Engineers (IEEE) 802.11 standard.

7. A wireless communication system, comprising:
a first transceiver included in a first access point to receive a request associated with a specification defining a traffic stream quality of service from a client unit, wherein the first access point is to locate a second access point to support the specification; and
a second transceiver included in the second access point to receive the request associated with the specification, wherein the second access point is to determine support of the specification,
wherein the specification includes a traffic specification selected in accordance with an Institute of Electrical and Electronics Engineers (IEEE) 802.11 standard.

8. The system of claim 7, further comprising:
the client unit to generate the request.

9. A wireless communication method, comprising:
determining a second access point to support a specification defining a traffic stream quality of service by one of a self-determination request sent from a user wireless device communicating with a first access point to the second access point, or an access point determination request sent to the first access point comprising
a list of candidate access points including the second access point, wherein the specification includes a traffic specification selected in accordance with an Institute of Electrical and Electronics Engineers (IEEE) 802.11 standard.

10. The method of claim 9, further comprising:
handing off a communication between the first access point and the device to the second access point upon receiving an indication that the second access point is to support the specification.

11. A user wireless communication apparatus, comprising:
a transmitter to send a request associated with a specification defining a traffic stream quality of service to a first access point to locate a second access point to support the specification;
a memory coupled to the transmitter to store a list of candidate access points including the second access point; and
a determination module to determine a capability of a candidate access point to support the specification comprising a traffic specification selected in accordance with an Institute of Electrical and Electronics Engineers (IEEE) 802.11 standard.

12. A wireless communication method, comprising:
receiving a request, at a first access point, associated with a traffic specification defining a traffic stream quality of service and selected in accordance with an Institute of Electrical and Electronics Engineers (IEEE) 802.11 standard and a list of candidate access points including a second access point to support the traffic specification;
sending the request to at least one of the candidate access points including the second access point;
determining, by the second access point, that the second access point will support the specification; and
handing off a communication between the first access point and a device to the second access point upon receiving an indication that the second access point is to support the specification.

* * * * *